US008427598B2

(12) United States Patent
Horie (10) Patent No.: US 8,427,598 B2
(45) Date of Patent: Apr. 23, 2013

(54) INPUT DEVICE WITH DISPLAY FUNCTION (75) Inventor: Toshihiko Horie, Ageo (JP)

(73) Assignee: Wacom Co., Ltd., Saitama (JP)

( * ) Notice: Subject to any disclaimer, the term of this patent is extended or adjusted under 35 U.S.C. 154(b) by 1059 days.

(21) Appl. No.: 12/365,857

(22) Filed: Feb. 4, 2009

(65) Prior Publication Data

US 2010/0033447 A1 Feb. 11, 2010

(30) Foreign Application Priority Data

Feb. 25, 2008 (JP) .................................. 2008-043581

(51) Int. Cl.
*G02F 1/1333* (2006.01)
(52) U.S. Cl.
USPC ............... 349/58; 349/60; 345/174; 345/173; 345/87; 29/428
(58) Field of Classification Search .................... 349/15, 349/60; 345/173, 174, 87; 29/428
See application file for complete search history.

(56) References Cited

U.S. PATENT DOCUMENTS

| 5,706,067 | A * | 1/1998 | Colgan et al. .................. 349/114 |
| 6,215,476 | B1 * | 4/2001 | Depew et al. .................. 345/173 |
| 7,196,695 | B2 * | 3/2007 | Lin ............................... 345/173 |
| 7,499,130 | B2 * | 3/2009 | Tsai et al. ..................... 349/110 |
| 7,525,535 | B2 | 4/2009 | Kim et al. |
| 7,920,225 | B2 * | 4/2011 | Nishikawa et al. ............. 349/60 |
| 7,944,521 | B2 * | 5/2011 | Ichioka et al. ................. 349/58 |
| 2005/0057703 | A1 * | 3/2005 | Tsubokura et al. ............. 349/58 |
| 2006/0007054 | A1 * | 1/2006 | Chang et al. ................... 345/1.3 |
| 2006/0038274 | A1 * | 2/2006 | Ono et al. ...................... 257/686 |
| 2006/0044490 | A1 * | 3/2006 | Ichioka et al. .................. 349/58 |
| 2006/0132465 | A1 * | 6/2006 | Nishikawa et al. ........... 345/174 |
| 2007/0222912 | A1 * | 9/2007 | Sato et al. ........................ 349/58 |
| 2008/0024462 | A1 * | 1/2008 | Kim et al. ..................... 345/174 |

FOREIGN PATENT DOCUMENTS

| CN | 101115256 A | 1/2008 |
| EP | 0640936 A1 | 3/1995 |
| EP | 1884870 A1 | 2/2008 |
| JP | 2005-275381 A | 10/2005 |
| JP | 2006048166 A | 2/2006 |
| JP | 2006-309308 A | 11/2006 |
| JP | 2007-293488 | * 8/2007 |
| JP | 2007-293488 A | 11/2007 |

OTHER PUBLICATIONS

Extended European Search Report for Corresponding EP Application No. 09002668.3 dated Feb. 18, 2011, 3 pages.
Korean Office Action dated Nov. 29, 2012, for corresponding Korean Application No. 10-2012-0095545, 4 pages.

* cited by examiner

*Primary Examiner* — Edward Glick
*Assistant Examiner* — Sang V Nguyen
(74) *Attorney, Agent, or Firm* — Seed IP Law Group PLLC (57) ABSTRACT

A liquid crystal module (1) includes a transparent panel (2) having a frame (3) projecting substantially perpendicularly from one surface thereof. The module also includes a flat panel display unit having a liquid crystal cell (6), a liquid crystal back light (7), and a liquid crystal back light unit (8), for example. The module further includes a flat sensor (9), such as a thin digitizer (a coordinate position inputting sensor). The frame is configured such that the flat panel display unit and the flat sensor can be readily housed and secured within a housing portion inside the frame.

19 Claims, 12 Drawing Sheets

INPUT DEVICE WITH DISPLAY FUNCTION

CROSS REFERENCES TO RELATED APPLICATIONS

The present application claims priority under 35 U.S.C. §119 from Japanese Patent Application JP 2008-043581, filed in the Japanese Patent Office on Feb. 25, 2008, the entire contents of which are incorporated herein by reference.

BACKGROUND OF THE INVENTION

1. Field of the Invention

The present invention relates to an input device with display function for performing input operation to a digitizer (a coordinate position inputting sensor) based on, for example, an electromagnetic resonance technology.

2. Description of the Related Art

In recent years, there has been proposed an input device with liquid crystal display function to be applied to an electronic device such as a personal computer, a PDA (personal digital assistant) or the like. There also has been proposed a position detecting device in which a shield plate is used (see Japanese Unexamined Patent Application Publication No. 2005-275381 and Japanese Unexamined Patent Application Publication No. 2006-309308).

Figure 12:
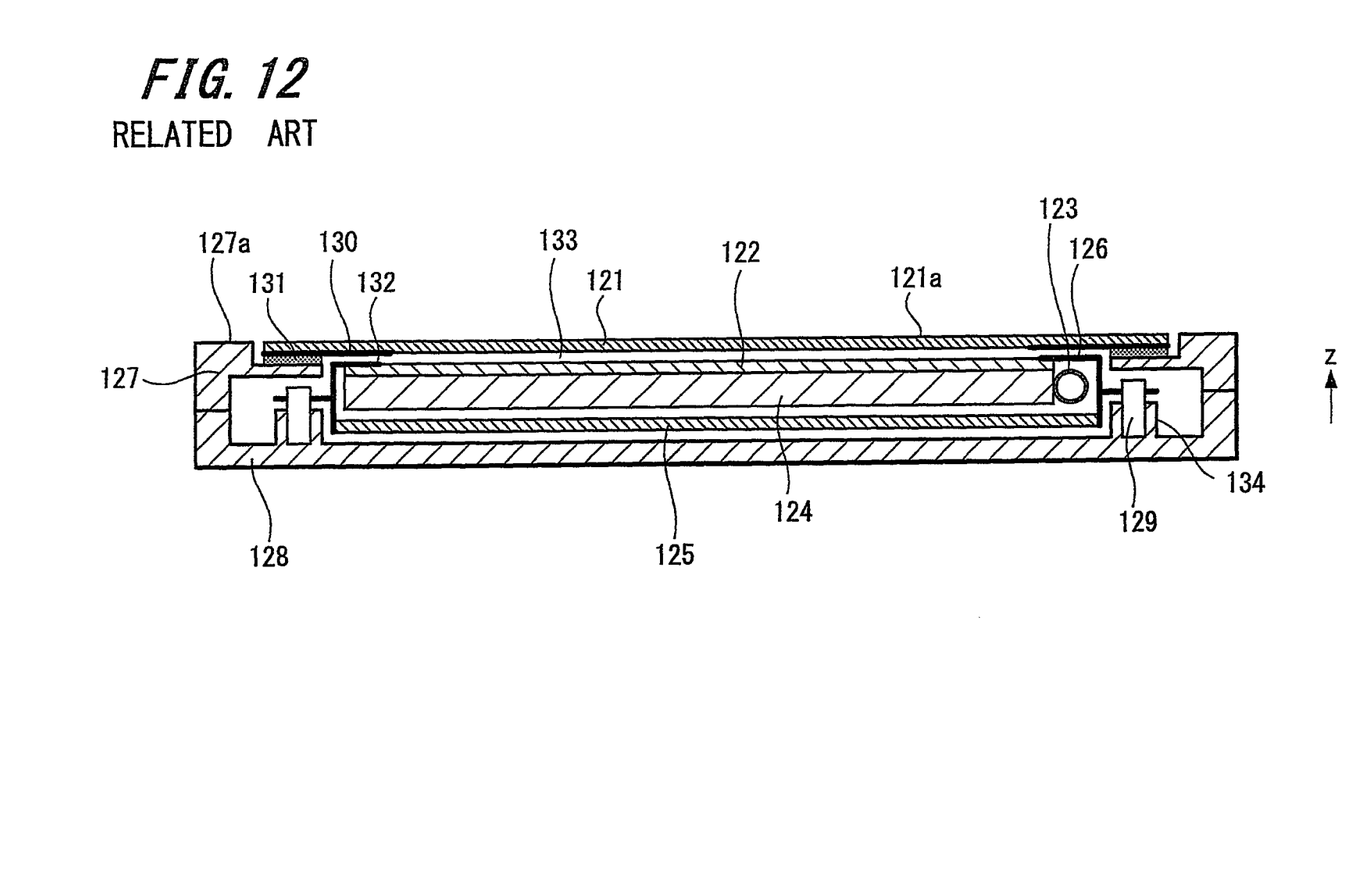
FIG. 12 is a view showing the internal structure of an input device with liquid crystal display function according to the prior art.

FIG. 12 shows the internal structure of an input device with liquid crystal display function according to related art. In such an input device, a protective plate 121 made of glass, for example, is bonded to an upper case 127 with an adhesive 131. A silk-screen printed portion 130 for shielding light is provided on a lower surface of an end portion of the protective plate 121.

A liquid crystal cell 122 is arranged in a lower case 128. A liquid crystal back light 123 and a liquid crystal back light unit 124 are fixed to the liquid crystal cell 122 via a metal bezel 126 by screwing screws 129 into bosses 134 in the lower case 128. A flat shaped digitizer 125 is arranged under a rear surface of the liquid crystal back light unit 124.

As seen in FIG. 12, since an air layer 133 exists between the liquid crystal cell 122 attached to the lower case 128 and the protective plate 121 attached to the upper case 127, all assembly of the input device, as seen in FIG. 12, is performed in a clean room so that no dust and the like is mixed into the air layer 133.

Figure 13:
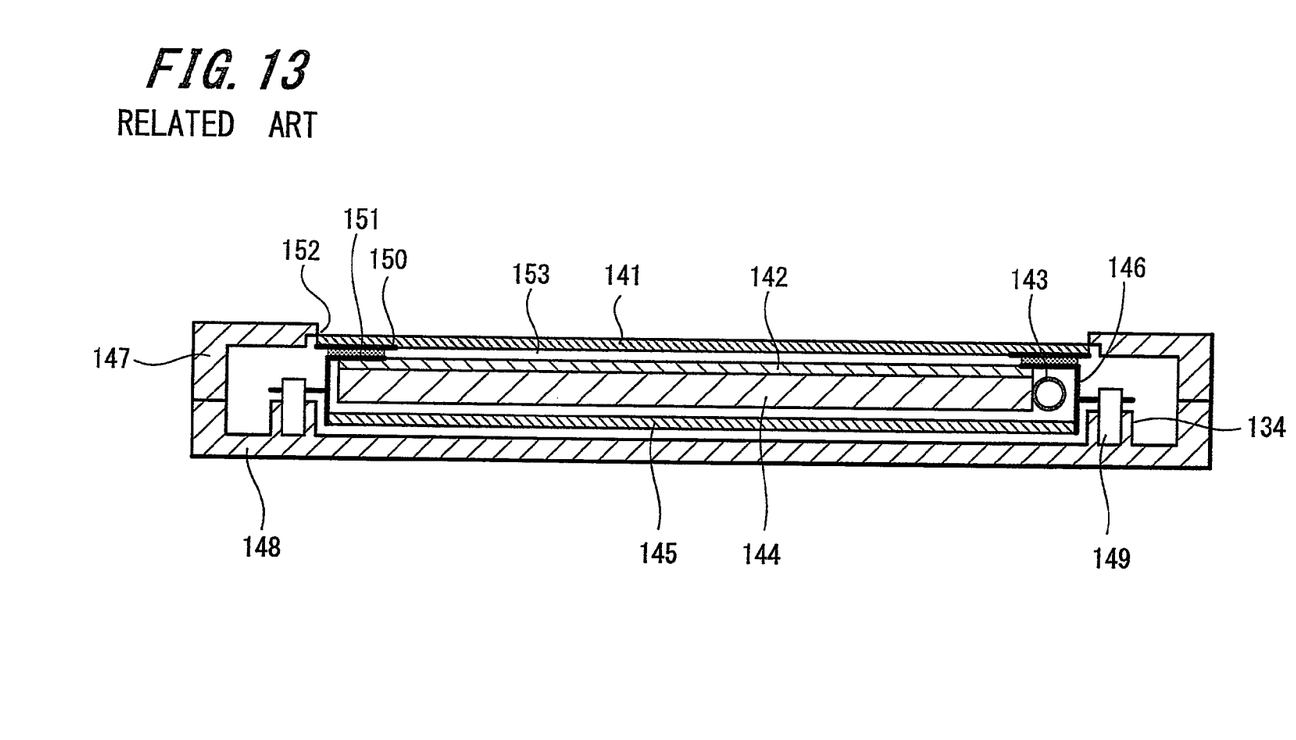
FIG. 13 is a view showing the internal structure of an input device with liquid crystal display function according to the prior art.

FIG. 13 shows the internal structure of an input device with liquid crystal display function according to another related art. In such an input device, a protective plate 141 is bonded to a liquid crystal cell 142 with an adhesive 151. A silk-screen printed portion 150 for shielding light is provided on a lower surface of an end portion of the protective plate 141. An upper case 147 is arranged so as to cover the end portion of the protective plate 141.

A liquid crystal back light 143 and a liquid crystal back light unit 144 are fixed to the liquid crystal cell 142 via a metal bezel 146 by screwing screws 149 into the bosses in a lower case 148. A flat shaped digitizer 145 is arranged under a rear surface of the liquid crystal back light unit 144.

As seen in FIG. 13, an air layer 153 exists between the protective plate 141 and the liquid crystal cell 142. In this case, all assembly of the input device, except for the process of bonding the protective plate 141 to the liquid crystal cell 142 with the adhesive 151, can be performed in a normal environment, instead of being performed in a clean room (see FIG. 13).

In the input devices with liquid crystal display function having the aforesaid arrangements, input operation is performed with, for example, a stylus pen (not shown). Specifically, input operation is performed by abutting the pen-tip of the stylus pen against the protective plates 121 or 141 to draw an illustration or write a character, just like drawing or writing with an ordinary ballpoint pen or pencil. Further, input operation is detected and converted into digital data by the digitizers 125 or 145, and the digital data is inputted into a personal computer, a PDA, or the like, so that a handwriting input operation, such as drawing an illustration or writing a character, can be performed on the computer and the like.

SUMMARY OF THE INVENTION

In the arrangement shown in FIG. 12, the protective plate 121 is bonded to the upper case 127 with the adhesive 131, and the liquid crystal cell 122 is fixed to the lower case 128 by the screws 129. Due to the play of the screws and the like, it is difficult to maintain the gap tolerance between the protective plate 121 and the liquid crystal cell 122 under an acceptable value. Further, it is difficult to determine a light shielding position alignment point 132 for performing position alignment between the silk-screen printed portion 130, the display area of the liquid crystal cell 122, and the metal bezel 126.

Further, in the arrangement shown in FIG. 13, since all components are fixed to the lower case 148 by the screws 149, if the protective plate 141 is attached to the upper case 147 with low accuracy, a gap 152 will be generated between the protective plate 141 and the upper case 147. Also, similar to the arrangement shown in FIG. 12, since all components are fixed to the lower case 148 by the screws 149, there is a concern that the upper case 147 may be offset from the end portion(s) of the protective plate 141 in the thickness direction (i.e., in Z-direction, see FIG. 12).

In the case of an ordinary liquid crystal display device with no input function, even if the offset or the gap 152 is generated, it will cause no problem in function, though it does cause some problems in appearance. However, in the case of an input device with liquid crystal display function, since a user performs handwriting input operation on the upper surface of the protective plate 121 or 141 with a pen-like position indicator, operability will be impaired because the pen-tip may be drawn over the gap 152 or fall into the gap 152. Further, if an offset is generated between an upper surface 121a of the protective plate 121 and an upper surface 127a of the upper case 127, operability will be impaired since the user's hand may touch the offsetting (stepping) portion.

Further, in the arrangements shown in FIGS. 12 and 13, since all components have to be fixed to the lower case 128 or 148 with the screws 129 or 149, the lower case 128 or 148 needs to be formed with bosses 134 for receiving the screws 129 or 149. In order to form the bosses 134, the lower case 128 is typically produced either by using a sheet metal process, or by using an injection molding process. Thus, the number of choices for the material and shape of the lower case 128 is limited.

Accordingly, it is an object of the present invention to provide an input device with display function, which has a high degree of freedom in design, excellent operability, and in which position alignment for assembling components of the display module can be simply performed.

To achieve the above-mentioned object, an input device with display function according to an aspect of the present invention includes: a transparent panel (protective plate) having a frame projecting substantially perpendicularly from one surface thereof; a flat panel display unit; and a flat sensor for detecting a position indicating operation performed on the other surface of the transparent panel. The flat panel display unit is housed in the frame such that a display surface of the flat panel display unit opposes the transparent panel. The flat sensor is also housed in the frame adjacent to the flat panel display unit. In this configuration, the flat panel display unit, the flat sensor, and the transparent panel are fixed to each other.

The flat sensor may be located adjacent to the display surface of the flat panel display unit, so that the flat sensor is positioned between the transparent panel and the flat panel display unit. Alternatively, the flat sensor may be located adjacent to the opposite surface of the flat panel display unit, so that the flat panel display unit is positioned between the transparent panel and the flat sensor.

The flat panel display unit may be a liquid crystal display unit including a liquid crystal cell and a liquid crystal back light unit, an organic EL display unit, a plasma display unit, or the like.

According to the present invention, since the frame is provided on the lower surface side of the transparent panel to house and secure therein the flat panel display unit and the flat sensor, positioning and assembly of the transparent panel, the flat panel display unit, and the flat sensor can be easily and precisely performed.

BRIEF DESCRIPTION OF THE DRAWINGS

FIGS. 4A and 4B show another embodiment of a frame which includes a brim portion, wherein FIG. 4A is a perspective view and FIG. 4B is an enlarged cross section taken along line b-b' of FIG. 4A;

FIGS. 5A and 5B show yet another embodiment of a frame which is integrally formed with a protective plate, wherein FIG. 5A is a perspective view and FIG. 5B is an enlarged cross section taken along line c-c' of FIG. 5A;

FIGS. 6A and 6B show a further embodiment of a frame which has a tapered portion, wherein FIG. 6A is a perspective view and FIG. 6B is an enlarged cross section taken along line d-d' of FIG. 6A;

DETAILED DESCRIPTION OF THE PREFERRED EMBODIMENTS

Various embodiments of the present invention will be described below with reference to FIGS. 1 to 11. Like components are denoted by like numerals throughout FIGS. 1 to 11.

Figure 1:
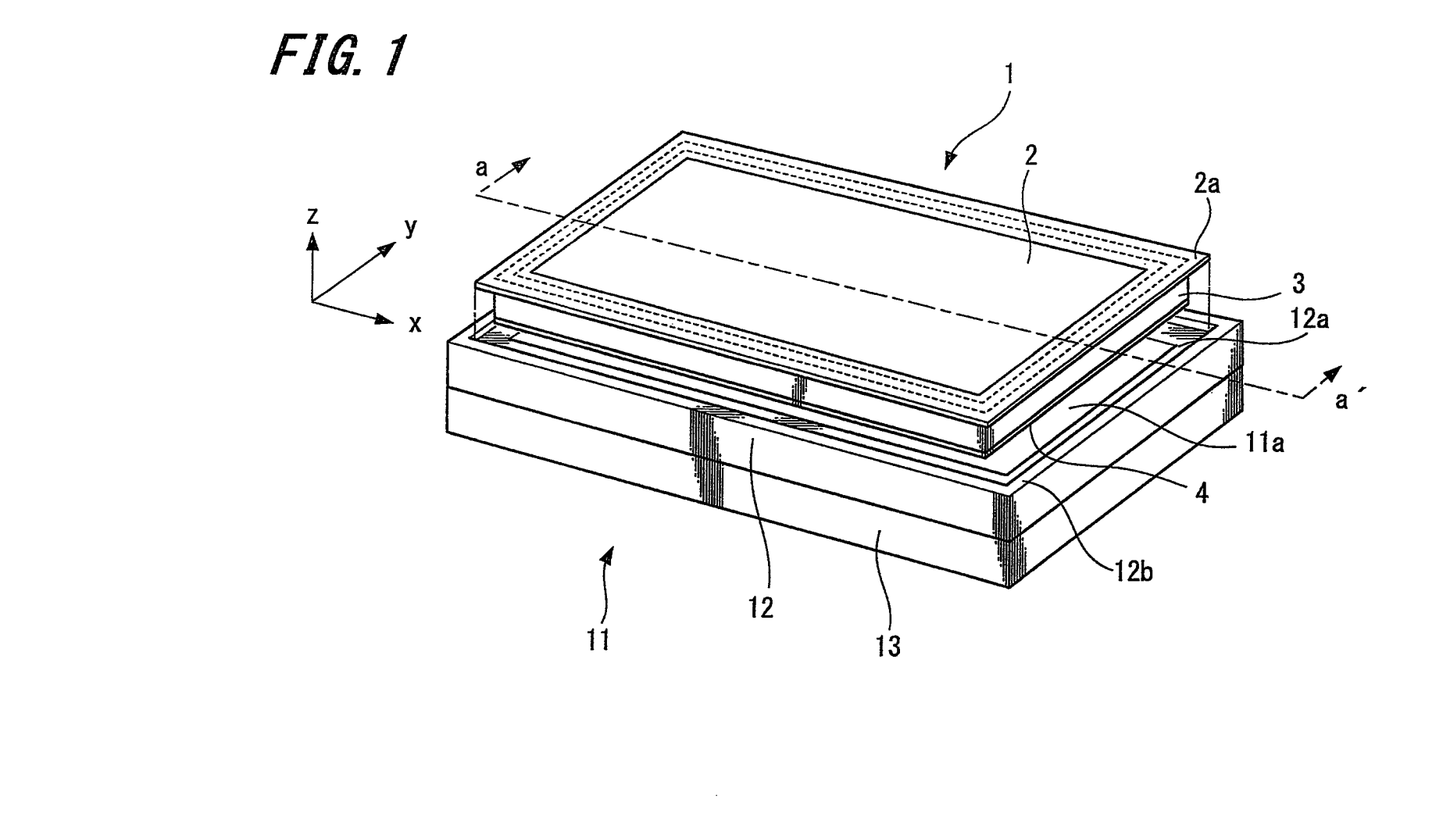
FIG. 1 is a perspective view showing an overview of an input device with liquid crystal display function according to an embodiment of the present invention.

FIG. 1 is a perspective view showing an overview of an input device with liquid crystal display function according to one embodiment of the present invention.

As shown in FIG. 1, the input device with liquid crystal display function according to the present embodiment includes a liquid crystal module 1 and a case 11. The liquid crystal module 1 includes a protective plate 2 as a transparent panel, a frame 3 projecting from a lower surface of the protective plate 2, and a metal bezel 4 covering an end portion of a lower surface of the frame 3. The protective plate 2 is made of, for example, transparent glass, and the frame 3 is made of, for example, a resin material. The metal bezel 4 has a substantially L-shaped cross section.

A liquid crystal cell 6 and a digitizer 9 (which are to be described later, see FIG. 2) may be housed within the frame 3. As a result, the position of the liquid crystal cell 6 can be readily determined in X-direction and Y-direction relative to the frame 3. While the present embodiment is described based on an example in which the frame 3 is directly secured to the protective plate 2, the present invention also includes a configuration in which a projection is formed on the lower surface of the protective plate 2 along the portion where the frame 3 is to be attached (see the area indicated by the dotted lines in FIG. 1). The projection is provided to serve as a reference during assembly of various components, so as to reduce an assembling tolerance for the liquid crystal cell, a liquid crystal back light unit (which is to be described later), and the like.

The case 11 includes an upper case 12 and a lower case 13. The upper case 12 and the lower case 13 have an opening 11a for housing the frame 3 of the liquid crystal module 1. A space for receiving the frame 3 is provided in a lower portion of the opening 11a of the upper case 12 (toward the side of the lower case).

Further, the upper case 12 has a recessed portion 12a formed in the periphery of the opening 11a. The recessed portion 12a is formed so that when the liquid crystal module 1 is housed in the case 11, the upper surface 12b of the upper case 12 and the upper surface 2a of the protective plate 2 of the liquid crystal module 1 substantially have the same height (in Z-direction). At this time, a portion of the protective plate 2 outside of (peripheral to) the frame 3 is fitted into the recessed portion 12a of the upper case 12. Further, the lower surface of the protective plate 2 is fixed to the recessed portion 12a with an adhesive or the like. Since no offset (stepped portion) is formed between the upper surface 12b of the upper case 12 and the upper surface 2a of the protective plate 2, the input device with liquid crystal display function has good operability.

The protective plate 2 is shaped so that it can be closely fitted within the opening 11a of the upper case 12. By shaping the protective plate 2 in such a manner, no gap is generated in the horizontal direction (i.e., in X-axis direction and Y-axis direction), and the liquid crystal module 1 can be closely fitted into the case 11. As a result, when a user performs a handwriting operation with a stylus pen (not shown), operability will not be impaired when the pen-tip of the stylus pen is drawn over the boundary portion between the protective plate 2 and the upper case 12.

Next, the internal structure of the input device with liquid crystal display function according to the present embodiment will be described below.

Figure 2:
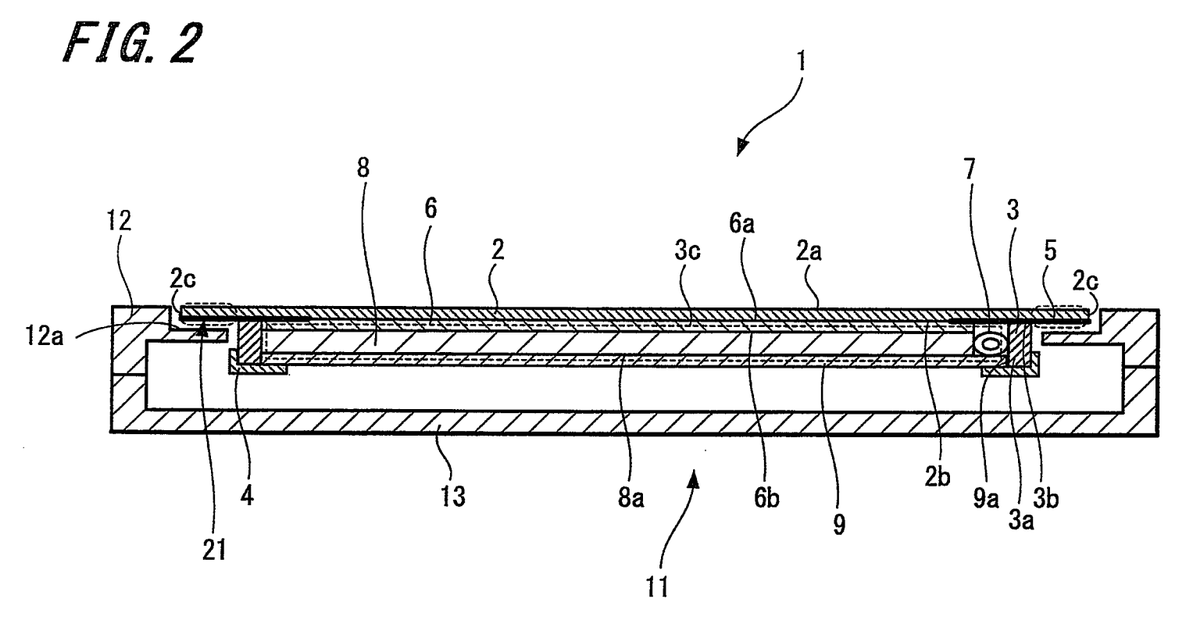
FIGS. 2 and 2A are each a cross section taken along line a-a' of the input device shown in FIG. 1.

FIG. 2 is a cross section taken along line a-a' of the input device shown in FIG. 1.

As shown in FIG. 2, in the liquid crystal module 1, a silk-screen printed portion 5 for shielding light is provided on a lower surface 2b of the protective plate 2, which may be made of transparent glass, for example. The frame 3 configured with a resin-made main body 3a is attached to the protective plate 2 by applying an adhesive to a bonding surface 3b, such that the silk-screen printed portion 5 is sandwiched between the protective plate 2 and the frame 3. Additionally, the frame 3 is fixed to a predetermined position inward from an end portion 2c of the protective plate 2.

The main body 3a of the frame 3 is configured so as to form a housing portion 3c for housing a liquid crystal cell 6 (which is to be described later) and the like inside the frame 3. The liquid crystal cell 6 is housed in the housing portion 3c so that a display surface 6a thereof closely contacts the lower surface 2b of the protective plate 2.

The position of the liquid crystal cell 6 can be determined by arranging the frame 3 to a desired position on the lower surface 2b of the protective plate 2. Further, due to the placement of the silk-screen printed portion 5, the bonding surface 3b where the protective plate 2 and the frame 3 are bonded together may be made invisible (concealed). The frame 3 extending from the protective plate 2 facilitates proper positioning of the liquid crystal cell, and thus alignment between the silk-screen printed portion 5 of the protective plate 2 and the liquid crystal cell 6 is also facilitated. Note that, although the silk-screen printed portion 5 is arranged between the lower surface 2b of the protective plate 2 and the frame 3 in the present embodiment, the silk-screen printed portion 5 may also be arranged on the upper surface 2a of the protective plate 2.

A liquid crystal back light 7 and a liquid crystal back light unit 8, such as a light guiding plate, are provided on a rear surface 6b of the liquid crystal cell 6, and a digitizer (sensor) 9 is provided under a rear surface 8a of the liquid crystal back light unit 8. Further, an end portion 9a of the digitizer 9 is fixed to the frame 3, which may be made of resin or the like, using the metal bezel 4 having a substantially L-shaped cross section.

Since the joining surface of the protective plate 2 is brought into close contact with the joining surface of the display surface 6a of the liquid crystal cell 6, all processes, except for the process of bringing the protective plate 2 into close contact with the liquid crystal cell 6, can be performed in a normal environment, instead of being performed in a clean room.

A connecting portion 21, which is located outside of the bonding surface 3b where the protective plate 2 and the frame 3 are bonded together, is fitted into the recessed portion 12a of the upper case 12. Further, the connecting portion 21 is brought into contact with and fixed to the recessed portion 12a of the upper case 12.

As has been mentioned above, the recessed portion 12a is formed so that, when the liquid crystal module 1 is housed in the case 11, the upper surface 12b of the upper case 12 and the upper surface 2a of the protective plate 2 have substantially the same height (in Z-direction). Since the opening 11a of the upper case 12 is shaped corresponding to the shape of the protective plate 2, after the protective plate 2 is fitted into the recessed portion 12a of the upper case 12, the protective plate 2 can be fixed to the upper case 12 merely by fixing the connecting portion 21 of the protective plate 2 to the recessed portion 12a with an adhesive or the like. As a result, substantially no clearance or offset will be generated between the protective plate 2 and the upper case 12.

Additionally, since it is not required to fix the liquid crystal module 1 to the lower case 13 by screws, it is not necessary to form bosses in the lower case 13 to install the liquid crystal cell 6 or the like. Thus, the lower case 13 does not have to be made of a magnesium alloy or other material, as in the prior art. Further, the lower case 13 can be produced without using sheet metal processing. As a result, the number of choices of the material and shape for the lower case is increased, and the degree of freedom in design of the position detecting device with liquid crystal display function can be increased.

Additionally, when the liquid crystal cell 6, the liquid crystal back light unit 8, and the digitizer 9 are all housed in the housing portion 3c of the frame 3, and if the protective plate 2 and the liquid crystal cell 6, the liquid crystal cell 6 and the liquid crystal back light unit 8, and the liquid crystal back light unit 8 and the digitizer 9 are respectively fixed to each other with an adhesive or the like, the metal bezel 4 will be unnecessary. In other words, the liquid crystal cell 6, the liquid crystal back light unit 8, and the digitizer 9 can be fixed either with the metal bezel 4, or with an adhesive or the like.

Figure 2A:
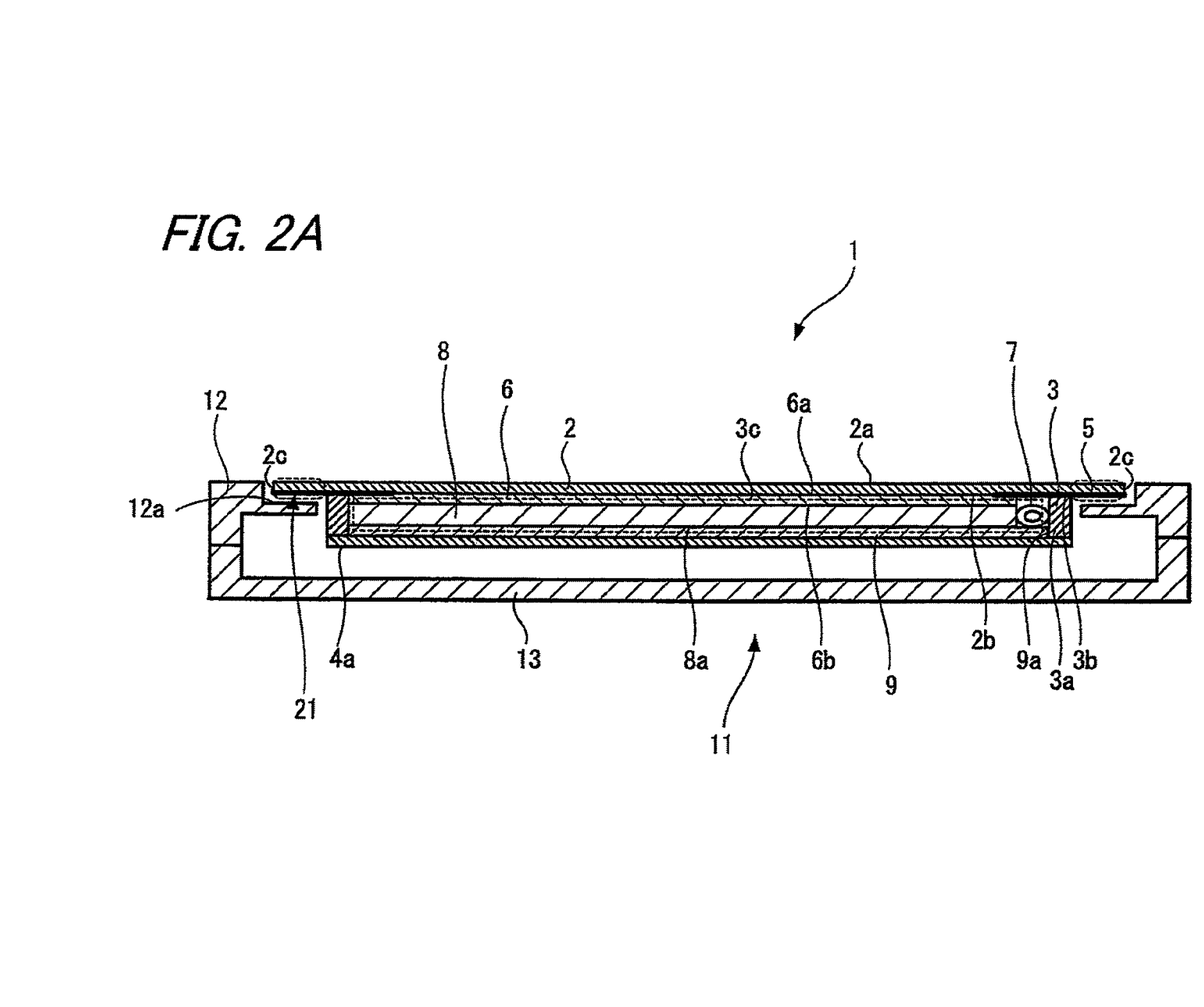

In another embodiment as shown in FIG. 2A, a shield plate 4a formed of a magnetic material (magnetic circuit plate) may also be used instead of the metal bezel 4 having a substantially L-shaped cross section. By using the shield plate 4a (provided on a rear surface of the digitizer 9), it is possible to provide an input device with liquid crystal display function in which the position of the entire rear surface of the digitizer 9 can be defined by the frame 3, and which is less susceptible to the influence of external noise. Since the magnetic circuit plate is formed of a relatively soft material, a reinforcing plate (not shown) may be provided on the lower surface (i.e., the surface facing the bottom of the lower case 13) of the magnetic circuit plate, and the reinforcing plate may be fixed to the frame 3 by screws or the like.

In another embodiment of the present invention, the upper case 12 and the lower case 13 may also be integrally formed. Further, instead of employing the silk-screen printed portion 5, a light shielding film can be employed or a light shielding ink can be applied. Further, a thin fluorescent display tube, an organic EL (organic Electro-Luminescence), an organic light-emitting diode, or a Light Emitting Polymer may be used instead of the liquid crystal cell 6, the liquid crystal back light 7, and the liquid crystal back light unit 8.

In the present embodiment, the protective plate 2 is made of glass or the like, the frame 3 is made of resin or the like, and the protective plate 2 and the frame 3 are fixed to each other through the bonding surface 3b with adhesive, screws, or another fixing mechanism. However, the protective plate 2 and the frame 3 may be integrally formed of the same material, such as a reinforced plastic with transparency.

Further, although the present embodiment is described using an example in which the frame 3 has a shape formed by four faces perpendicularly extending from the protective plate 2, the present invention is not limited to this example. For example, the present invention includes a configuration in which, among the aforesaid four faces, two opposing faces are arranged on the side of the protective plate 2 and the other two opposing faces are arranged on the side of the metal bezel 4, so that upon assembly of the liquid crystal module 1, the four faces are combined to together form the frame 3, which then defines the position of every component.

In summary, various embodiments of the present invention essentially contemplate an input device having a flat panel display unit, in which input operation can be performed on a (transparent) panel disposed in front of the flat panel display unit. The flat panel display unit and the panel disposed in front of the flat panel display unit are positioned with respect to each other based on a frame extending from the panel and are integrally fixed to each other. The panel is generally, but is not limited to, a protective panel for protecting the flat panel display unit. However, since the panel is disposed in front of the flat panel display unit, the panel is required to have a high optical transparency. Further, apart from the liquid crystal display unit, other displays such as an organic EL display, a plasma display, or the like may also be used as the flat panel display unit.

Next, the process of assembling the liquid crystal module 1 will be described below.

Figure 3:
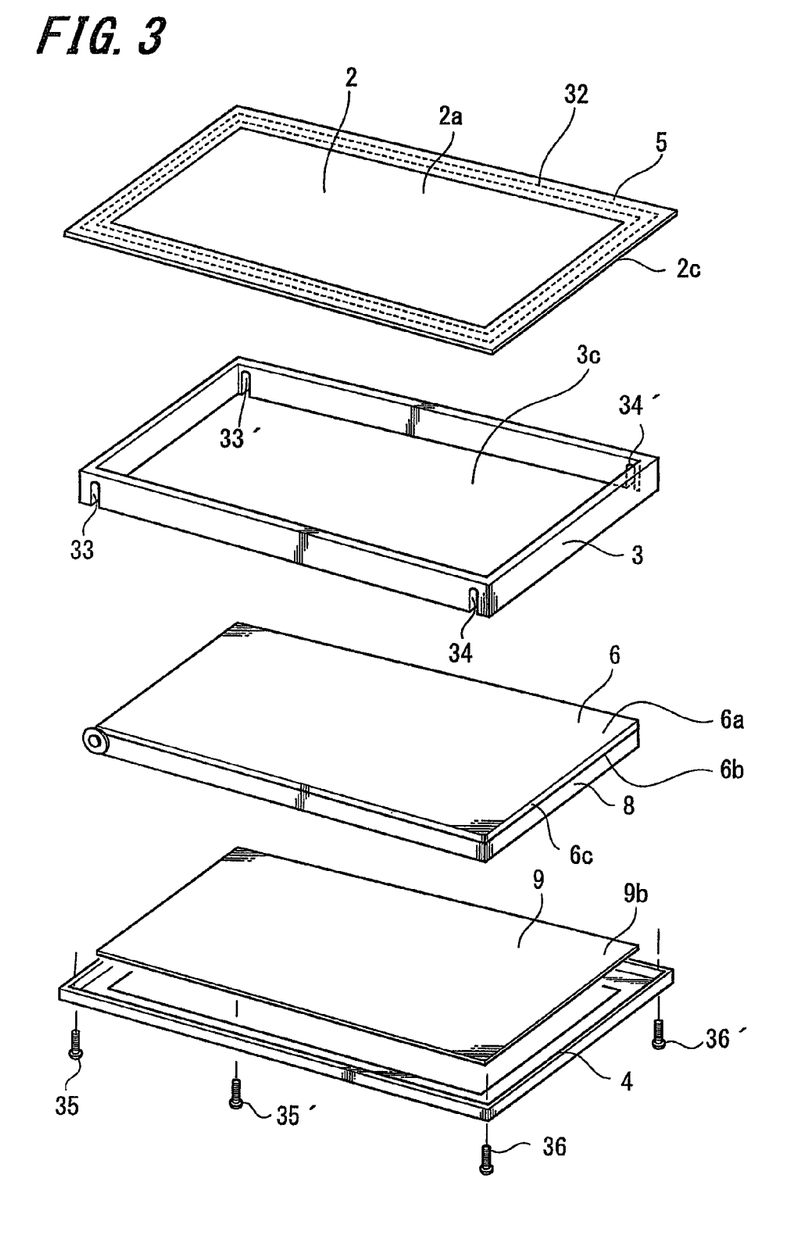
FIG. 3 is an exploded perspective view showing assembly of a liquid crystal module of the input device.

FIG. 3 is an exploded perspective view of an embodiment of the present invention showing how the liquid crystal module 1 is assembled.

As shown in FIG. 3, in the case where the protective plate 2 and the frame 3 are individual components separated from each other, the frame 3 is first fixed to a frame bonding surface 32 of the protective plate 2 with an adhesive or the like. The frame bonding surface 32 is placed within a range associated with the silk-screen printed portion 5 provided on the lower surface of the end portion 2*c* of the protective plate 2. The frame bonding surface 32 is provided on the protective plate 2 in a position inside the connecting portion 21 shown in FIG. 2.

Next, the liquid crystal cell 6 is positioned within the housing portion 3*c* inside the frame 3. Further, the lower surface of the protective plate 2 and the upper surface 6*a* of the liquid crystal cell 6 are bonded to each other with an adhesive or the like. Since the end portion 6*c* of the liquid crystal cell 6 is guided to a proper position inside the frame 3, the end portion 6*c* of the liquid crystal cell 6 is positioned within a range associated with the silk-screen printed portion 5 provided on the lower surface of the end portion 2*c* of the protective plate 2. This allows the end portion 6*c* of the liquid crystal cell 6 to be positioned in an invisible (concealed) manner.

The gap between the protective plate 2 and the liquid crystal cell 6 may be closed by placing a filler between the protective plate 2 and the liquid crystal cell 6. Further, the gap between the protective plate 2 and the liquid crystal cell 6 may also be closed by using a so-called optical bonding technology in which a filler having high transparency is placed between the protective plate 2 and the liquid crystal cell 6. For example, a silicon-based gel or adhesive is filled between the protective plate 2 and the liquid crystal cell 6 so that optical properties of the interface between the protective plate 2 and the liquid crystal cell 6 can be improved.

Next, the liquid crystal back light unit 8 is also positioned within the housing portion 3*c* inside the frame 3. Further, a lower surface of the liquid crystal cell 6 and an upper surface of the liquid crystal back light unit 8 are bonded to each other with an adhesive or the like. Although not shown in the attached drawings, the liquid crystal back light 7 is provided in an end portion of the liquid crystal back light unit 8 so that the light can be guided through the liquid crystal back light unit 8.

Next, the digitizer (sensor) 9 is positioned within the housing portion 3*c*, also inside the frame 3. As a result, alignment of the liquid crystal cell 6, the liquid crystal back light unit 8, and the digitizer 9 with respect to the protective plate 2 can be easily performed.

Further, the lower surface of the liquid crystal back light unit 8 and a front surface 9*b* of the digitizer 9 are bonded to each other with an adhesive or the like. Additionally, alignment may also be performed by using a jig (not shown) previously arranged on the protective plate 2 in a position inside the connecting portion 21 shown in FIG. 2, the jig being provided to guide the frame 3 into position.

Still further, the rear surface of the digitizer 9 may be fixed, via the metal bezel 4 having the substantially L-shaped cross section, to the frame 3 by inserting four screws 35, 36, 35', and 36' into four square holes 33, 34, 33', and 34', respectively, of the frame 3 and then tightening the screws.

In the actual assembling operation, all components may be oriented upside-down as compared to how they are shown in FIG. 3. The assembly operation begins with fixing the protective plate 2 to the frame 3. Note that, as has been mentioned above, in the case where the protective plate 2 and the frame 3 are integrally formed, the step of fixing the protective plate 2 and the frame 3 to each other may be skipped.

Next, the liquid crystal cell 6 can be properly positioned with reference to the frame 3, and the positioned liquid crystal cell 6 is fixed to the protective plate 2. Only this step is required to be performed in a clean room, and the other steps may be performed in a normal environment. Further, the liquid crystal back light unit 8 is fixed to the liquid crystal cell 6, and the digitizer 9 is fixed to the liquid crystal back light unit 8. Finally, the end portion 9*a* of the digitizer 9 is fixed to the frame 3 using the metal bezel 4, which has a substantially L-shaped cross section.

Further embodiments of the present invention will be described below with reference to FIGS. 4A to 8.

Figure 4A:
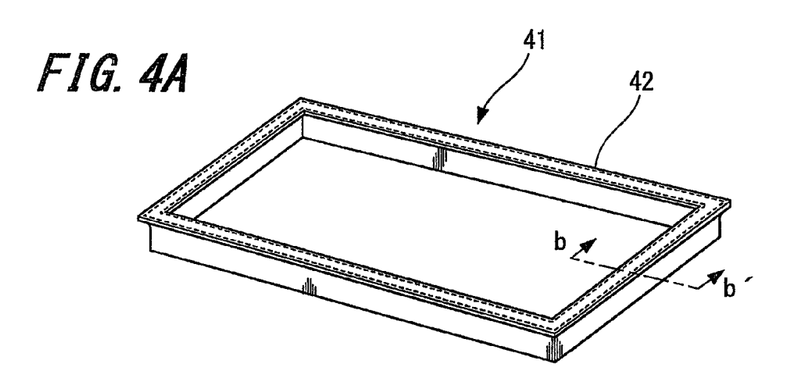
Figure 4B:
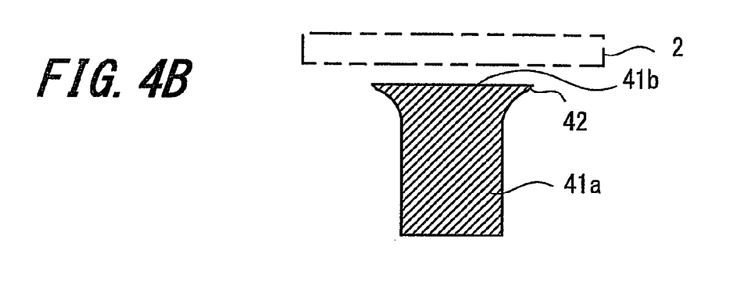

FIGS. 4A and 4B show an embodiment of a frame 41 which includes a brim (wide) portion 42, wherein FIG. 4A is a perspective view and FIG. 4B is an enlarged cross section taken along line b-b' of FIG. 4A.

Although the aforesaid embodiment is described using an example in which the main body of the frame has a uniform width, the frame may also have a configuration in which, compared to the width of the frame main body 41*a*, the portion to be bonded to the protective plate 2 has a larger width.

As shown in FIGS. 4A and 4B, the frame 41 has the main body 41*a*, the wide portion 42 continuing from the main body 41*a*, and a bonding surface 41*b* formed on an end face of the wide portion 42. As shown in the enlarged cross section of FIG. 4B, the width (i.e., the length in the direction parallel to the protective plate 2) of the wide portion 42 increases gradually from the main body 41*a* toward the protective plate 2, so that the width of the wide portion 42 is greater than that of the main body 41*a*.

Due to the provision of the wide portion 42, the area of the bonding surface between the frame 41 and the protective plate 2 is increased, and therefore the bonding strength between the frame 41 and the protective plate 2 is increased. The width of the wide portion 42 is set so that the wide portion 42 falls within a range associated with the silk-screen printed portion 5.

Figure 5A:
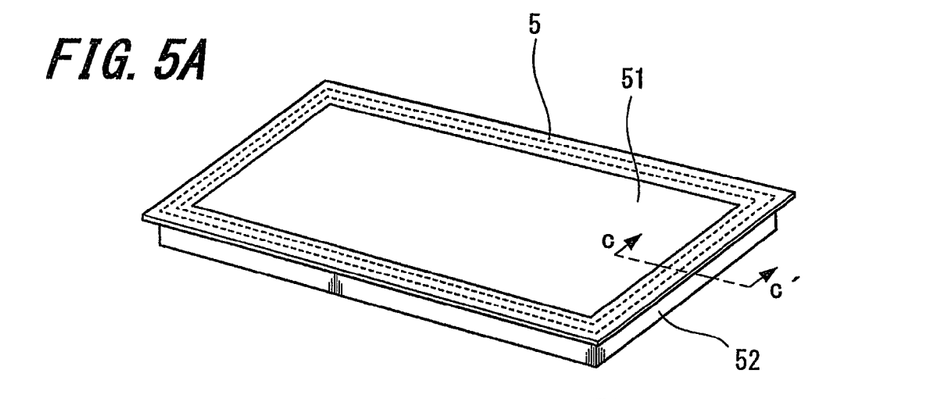
Figure 5B:
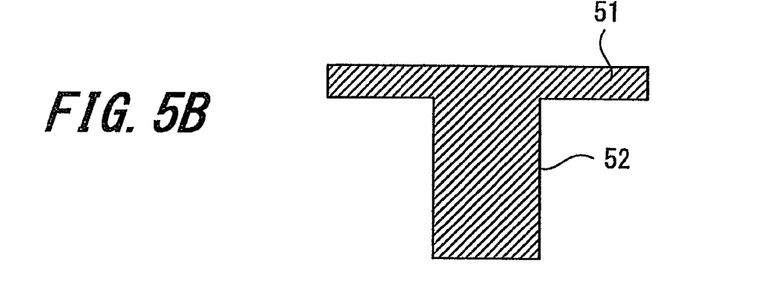

FIGS. 5A and 5B show another embodiment of a frame which is integrally formed from a frame portion 52 and a protective plate 51, wherein FIG. 5A is a perspective view and FIG. 5B is a cross section taken along line c-c' of FIG. 5A.

The aforesaid embodiment is described using an example in which the protective plate 2 and the frame 3 are individual components separated from each other, and are bonded to each other with an adhesive or the like. However, as will be described below, the present invention may also include a configuration in which the protective plate and the frame are integrally formed of a resin material, for example.

As shown in the enlarged cross section of FIG. 5B, a protective plate 51 and a frame portion 52 are integrally formed to form a frame having a substantially T-shaped cross section. As shown in FIG. 5A, the silk-screen printed portion 5 is arranged on an upper surface (a surface on which a user performs input operation) of the protective plate 51 so as to cover an area where the frame portion 52 meets the protective plate 51.

Figures 6A, 6B:
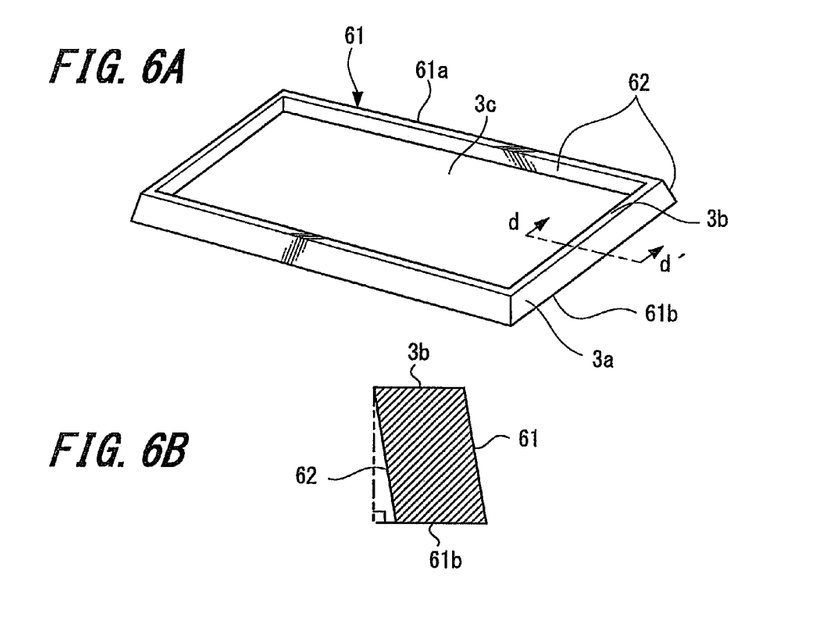

FIGS. 6A and 6B show another embodiment of the present invention, comprising a frame 61, which has a tapered portion 62, wherein FIG. 6A is a perspective view and FIG. 6B is an enlarged cross section taken along line d-d' of FIG. 6A.

The aforesaid embodiment is described using an example in which the main body 3a of the frame 3 has a shape that projects substantially perpendicularly to the protective plate 2. In other words, both the upper end portion and the lower end portion of the housing portion 3c of the frame 3 have the same width. However, the present invention may also include a configuration in which the frame has a tapering shape as described below.

As shown in FIG. 6A, the frame 61 includes the main body portion 61a forming four sides of the frame 61, wherein each pair of sides of the main body portions 61a opposing each other has a tapered portion 62 formed at least in an inner wall portion thereof. As shown in FIG. 6B, the tapered portion 62 is formed in a manner so that the width of the housing portion 3c becomes gradually greater, from the bonding surface 3b at the upper end portion toward the lower end portion 61b. Due to the larger area of the housing portion 3c at the lower end portion 61b created by the tapered portion 62, the liquid crystal cell 6, the liquid crystal back light unit 8, and the thin digitizer 9 (as seen in FIG. 3 for example) can be easily inserted from the side of the lower end portion 61b, and further, the inserted components can be rigidly secured.

As shown in the enlarged cross section of FIG. 6B, the tapered portion 62 is formed in both the inner wall portion and outer wall portion of each of the sides of the main body portion 61a of the frame 61. However, the tapered portion 62 may also be formed in the inner wall portion only. Further, a plurality of tapered portions 62 may be formed in a stepwise manner, forming steps along the inner wall portion of the frame 61 instead of a smooth inner wall portion of the frame 61.

Specifically, the liquid crystal cell 6, the liquid crystal back light unit 8, and the digitizer 9 are inserted sequentially in this order along the inner wall of the tapered portion 62 from the lower end portion 61b toward the upper end portion of the main body portion 61a of the frame 61 (i.e., toward the bonding surface 3b). In such a case, the sizes (i.e., the widths) of the liquid crystal cell 6, the liquid crystal back light unit 8, and the digitizer 9 need to be set corresponding to the tapering shape of the tapered portion 62.

Figure 7:
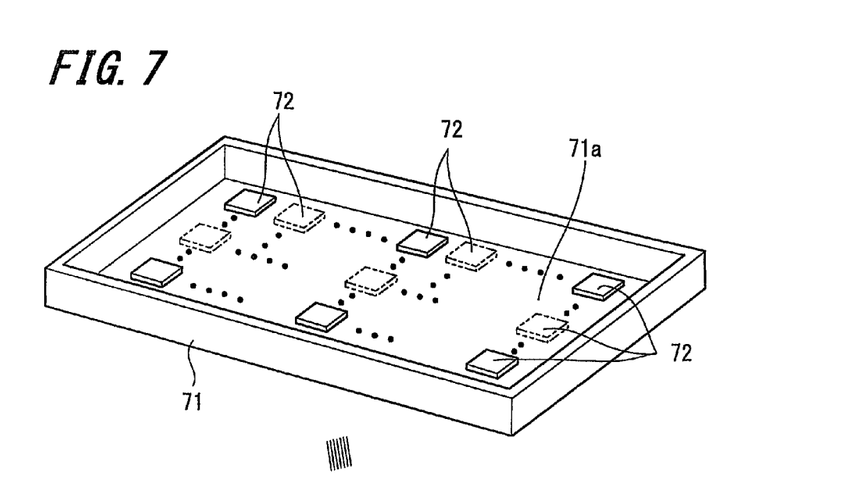
FIG. 7 is a view showing an embodiment of a lower case that has projections.

FIG. 7 is a view showing another embodiment of the lower case 71, which has projections 72.

Although the aforesaid embodiment is described using an example in which no support member is provided on the inner bottom of the lower case 13, the present invention may include a configuration in which the lower case is provided with the projections as described below.

As shown in FIG. 7, a plurality of projections 72 are arranged on an inner bottom 71a of a lower case 71. The width and height of each of the plurality of projections 72 are set so that the metal bezel 4 and the lower surface of the digitizer 9 of the liquid crystal module 1 shown in FIG. 2 can be supported by the projections 72.

Since the plurality of projections 72 abut the metal bezel 4 and the lower surface of the digitizer 9 constituting the liquid crystal module 1, the strength of the protective plate 2 is reinforced and the protective plate 2 is resistant to bending, even when the user puts his hand on the upper surface 2a of the protective plate 2 during an input operation, or even when the user strongly presses the protective plate 2 during an input operation with the stylus pen. Thus, the liquid crystal module 1 can be prevented from being bent downward.

Figure 8:
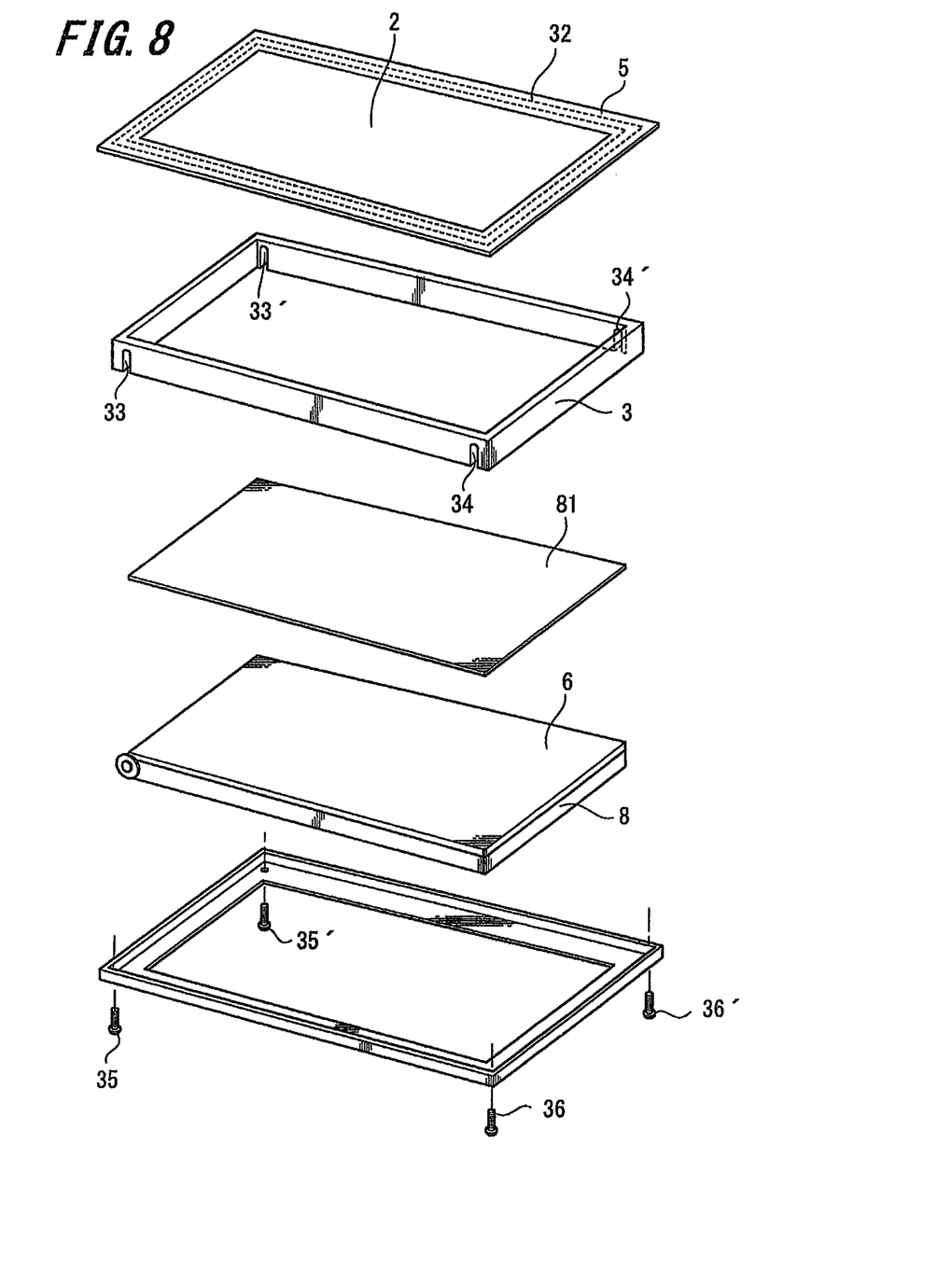
FIG. 8 is an exploded perspective view showing assembly of the liquid crystal module according to another embodiment.

FIG. 8 is an exploded perspective view showing assembly of the liquid crystal module according to another embodiment of the present invention.

Although the aforesaid embodiment is described based on an assumption that the digitizer (sensor) 9 is an electromagnetic induction type digitizer which operates based on electromagnetic resonance technology, the digitizer may also be a capacitive type sensor as described below. The capacitive type sensor is adapted to detect the position indicated by a stylus pen (not shown) or by a finger of the user. A well-known example of the capacitive type sensor is the one which includes a transparent electrode formed using an ITO film (Indium Tin Oxide film).

If a sensor is usable only when the distance to the object-to-be-detected (i.e., the finger of the user) is small, such as in the case of the capacitive type sensor, the sensor needs to be disposed as close to the protective plate 2 as possible. For this reason, in the embodiment shown in FIG. 8, a sensor 81 is arranged between the protective plate 2 and the liquid crystal cell 6. Since other structures are identical to those of the example shown in FIG. 3, further description of FIG. 8 will be omitted.

In this case, other sensor(s), such as a sensor using a resistance film, may be additionally arranged on the upper surface of the protective plate 2. With such an arrangement, contact of the stylus pen can be detected on the upper surface of the protective plate 2.

EXAMPLES OF APPLICATION

Examples of applying the liquid crystal module according to the aforesaid embodiments to various electronic devices will be described below with reference to FIGS. 9 to 11.

Figure 9:
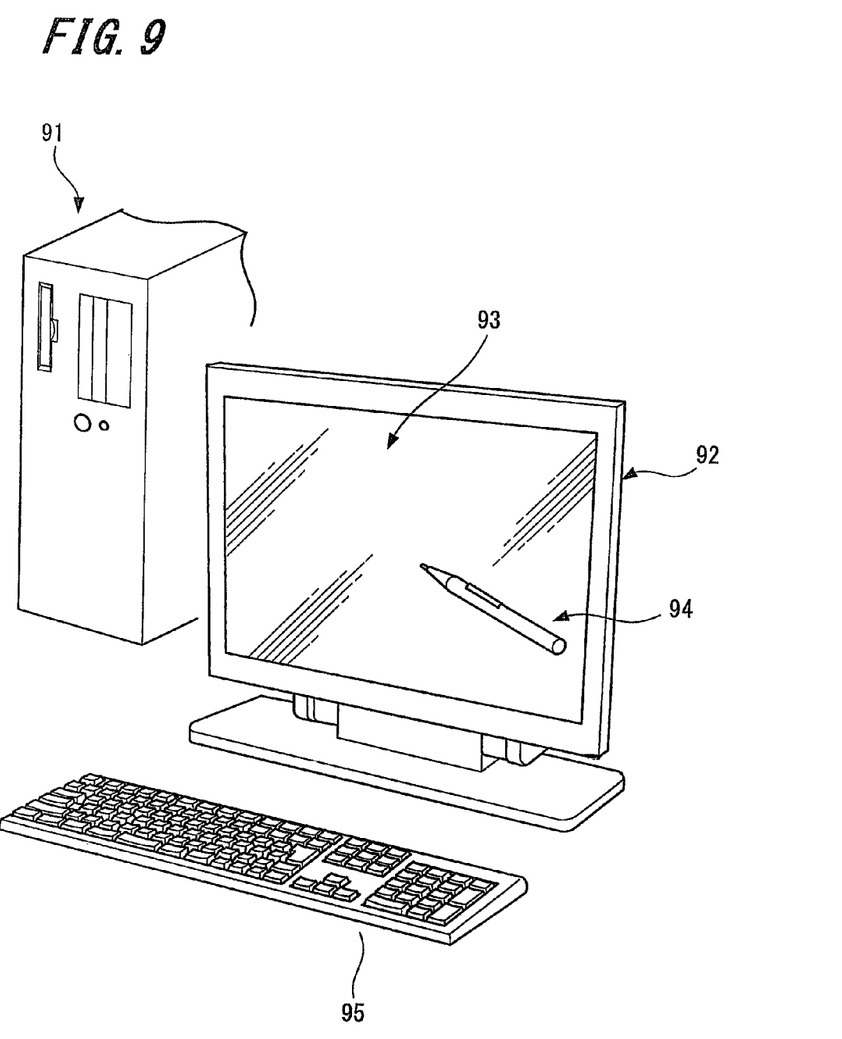
FIG. 9 shows a general-purpose personal computer including a liquid crystal module of the present invention.

FIG. 9 shows an example of applying the liquid crystal module to a general-purpose personal computer.

In the personal computer shown in FIG. 9, a liquid crystal module 93 according to the aforesaid embodiments is incorporated into a display 92 connected to a computer main body 91. With such a configuration, in order to perform a coordinate input operation on the personal computer shown in FIG. 9, the user uses a stylus pen 94 to draw lines or points on the screen of the liquid crystal module 93.

Note that, although FIG. 9 shows an example in which the personal computer and the display 92 are separated from each other, the present invention may also be applied to a computer in which the display 92 and the main body 91 are integrated, such as a laptop computer.

Figure 10:
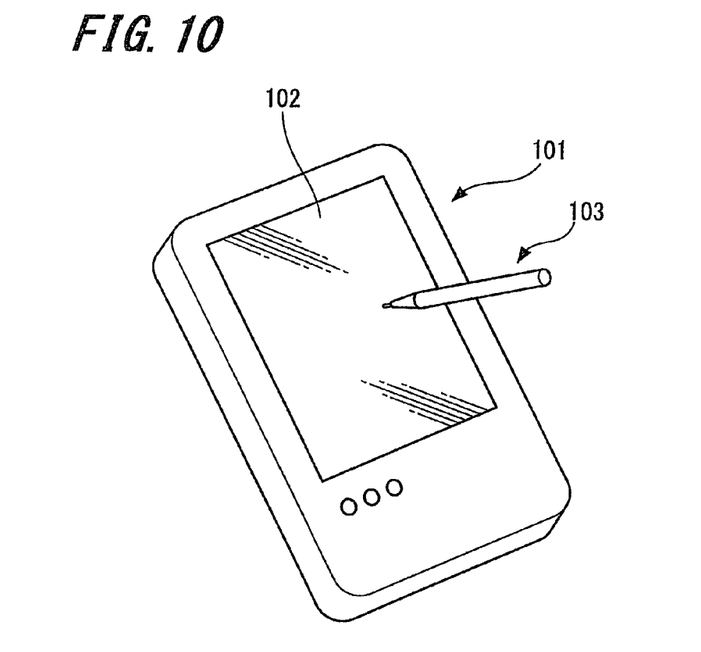
FIG. 10 shows a PDA (personal digital assistant) as a portable electronic device including a liquid crystal module of the present invention.

FIG. 10 shows an example of applying the liquid crystal module 102 to a PDA (personal digital assistant) 101 as a portable electronic device.

As shown in FIG. 10, a liquid crystal module 102 is incorporated into a display panel of a PDA 101. With such a configuration, in order to perform a coordinate input operation on the PDA 101, the user uses a stylus pen 103 to draw lines or points on the screen of the liquid crystal module 102. Note that the portable electronic device may also be a different device, such as a cell-phone, and is not limited to the PDA.

Figure 11:
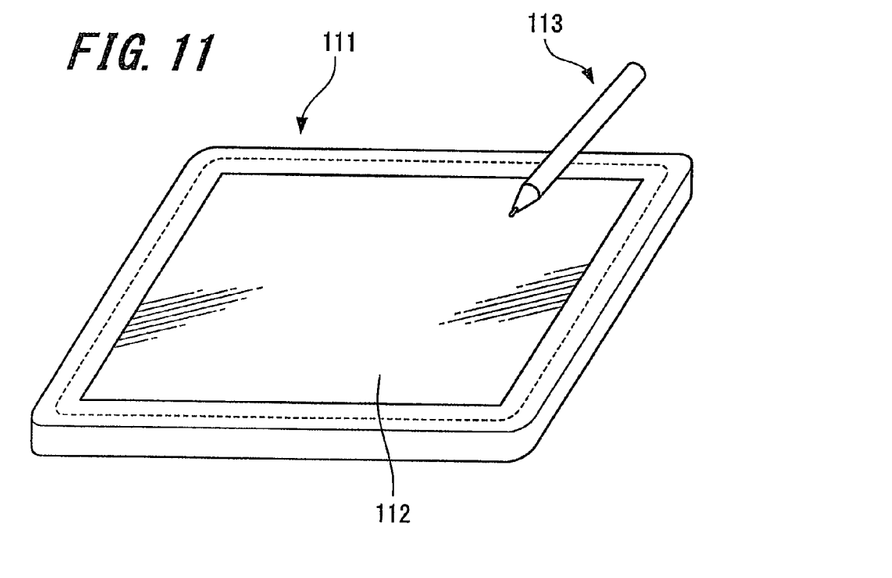
FIG. 11 shows a tablet as a portable electronic device including a liquid crystal module of the present invention.

FIG. 11 shows an example of applying the liquid crystal module to a tablet as a portable electronic device.

As shown in FIG. 11, a liquid crystal module 112 is arranged on a display panel of a tablet 111. With such a configuration, in order to perform a coordinate input operation on the tablet 111, the user uses a stylus pen 113 to draw lines or points on the screen of the liquid crystal module 112.

As has been described above, coordinate input operations can be performed by applying the liquid crystal module, according to various embodiments of the present invention, to a display or display panel of various electronic devices.

It should be noted that the present invention is not limited to the above embodiments but can be properly modified without departing from the spirit of the present invention.

What is claimed is:

1. An input device with display function comprising:
   a transparent panel having an input-receiving surface and an opposite surface, the panel having a frame that is unitarily formed with the transparent panel and that is projecting substantially perpendicularly from the opposite surface to form a housing space defined by the frame;
   a flat panel display unit housed in the housing space such that a display surface of the flat panel display unit opposes the transparent panel;
   a flat sensor for detecting a position indicating operation performed on the input-receiving surface of the transparent panel, which is arranged adjacent to the flat panel display unit and is housed in the housing space,
   wherein the flat panel display unit and the flat sensor are so housed in the housing space to be fixed to the transparent panel; and
   a case including an opening and a hollow interior, the opening is configured to receive and house within the hollow interior the transparent panel having the frame defining the housing space in which the flat panel display unit and the flat sensor are fixedly housed,
   wherein the frame is positioned spaced away from an outer edge of the transparent panel to project substantially perpendicularly therefrom to thereby define an end portion of the transparent panel that extends along a periphery of the transparent panel outside the frame, and
   wherein the end portion of the transparent panel is fixed to a portion of the case that defines the opening to thereby secure the transparent panel having the frame defining the housing space, in which the flat panel display unit and the flat sensor are housed, in the case.

2. The input device according to claim 1, wherein the flat panel display unit, the flat sensor, and the transparent panel are fixed to each other by bonding respective opposing surfaces together.

3. The input device according to claim 1, further comprising a bezel, wherein the flat panel display unit and the flat sensor housed in the frame are fixed to the transparent panel by the bezel.

4. The input device according to claim 1, wherein a light shielding area for shielding light is arranged on a surface of the transparent panel so as to cover an area above the frame projecting from the transparent panel.

5. The input device according to claim 1, wherein the frame projecting from the transparent panel is bonded to the transparent panel.

6. The input device according to claim 5, wherein the frame projecting from the transparent panel is bonded to the transparent panel with an adhesive.

7. The input device according to claim 6, wherein the transparent panel is made of glass, and the frame is made of a resin material.

8. The input device according to claim 1, wherein the frame projecting from the transparent panel is integrally formed with the transparent panel.

9. The input device according to claim 8, wherein the transparent panel and the frame are integrally formed of a resin material.

10. The input device according to claim 1, wherein an inner wall of the frame, in which the flat panel display unit and the flat sensor are housed, is formed in a taper shape, and the flat panel display unit and the flat sensor are positioned along the taper-shaped inner wall.

11. The input device according to claim 1, wherein the flat sensor is located adjacent to another surface of the flat panel display unit opposite to the display surface such that the flat panel display unit is positioned between the transparent panel and the flat sensor.

12. The input device according to claim 11, wherein the flat sensor is an electromagnetic induction type sensor which detects a position indicating operation performed with a pen-like position indicator on the input-receiving surface of the transparent panel.

13. The input device according to claim 12, wherein the flat sensor is provided with a magnetic shield plate on a surface of the flat sensor opposite from the flat panel display unit.

14. The input device according to claim 1, wherein the flat sensor is located adjacent to the display surface of the flat panel display unit such that the flat sensor is positioned between the transparent panel and the flat panel display unit.

15. The input device according to claim 14, wherein the flat sensor is a capacitive type sensor which detects a position indicating operation performed by a finger of a user on the input-receiving surface of the transparent panel.

16. The input device according to claim 1, wherein the flat panel display unit is selected from a group consisting of a liquid crystal display unit, an organic EL display unit, and a plasma display unit.

17. The input device according to claim 1, wherein said portion of the case that defines the opening includes a recessed portion that is dimensioned to mate with said end portion of the transparent panel.

18. The input device according to claim 1, which is a portable electronic device.

19. The input device according to claim 18, which is a tablet device.

* * * * *